June 23, 1931.  D. PYZEL  1,811,646
HYDROCARBON OIL TREATMENT
Filed June 29, 1927
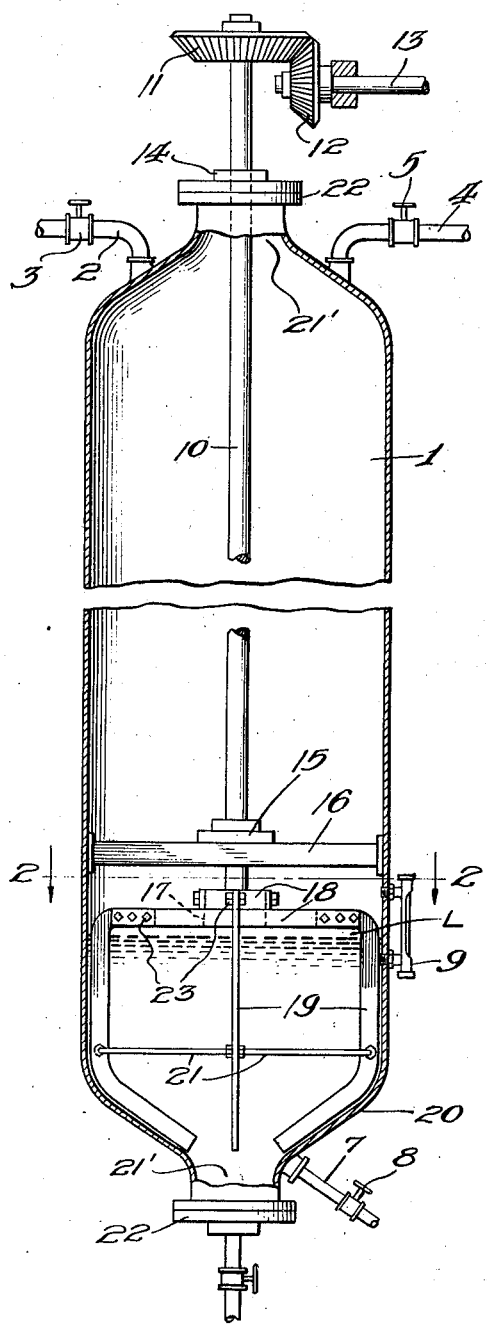
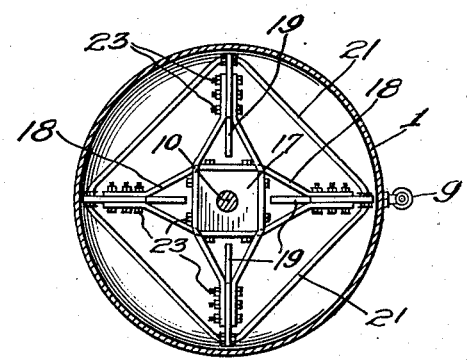
Inventor:
Daniel Pyzel,
By Frank L. Belknap
Atty.

Patented June 23, 1931

1,811,646

UNITED STATES PATENT OFFICE

DANIEL PYZEL, OF PIEDMONT, CALIFORNIA, ASSIGNOR TO UNIVERSAL OIL PRODUCTS COMPANY, OF CHICAGO, ILLINOIS, A CORPORATION OF SOUTH DAKOTA

HYDROCARBON OIL TREATMENT

Application filed June 29, 1927. Serial No. 202,192.

The present invention relates more particularly to improvements in the cracking of hydrocarbon oil under conditions of conversion temperature and superatmospheric pressure, to obtain therefrom conversion products having commercial value.

The invention in one specific embodiment is particularly adaptable to a cracking process carried out in a so-called tube and drum type of plant, but in its broader concept, it is to be understood that I do not in any way wish to limit the invention to use particularly with the tube and drum type of apparatus.

The invention resides primarily in a process of, and mechanical means for, controlling the flow of the material which passes in liquid state through the reaction zone or zones of liquid vapor phase cracking processes.

In one embodiment of its application, the invention comprises the step of imparting a mild eddy-like movement to the outer layer of a body of non-vaporous residual products of reaction which collect in the reaction drum, to thereby eliminate or substantially decrease the amount of stagnant oil adhering to the walls of the drum.

An object of the present invention is to prevent the non-vaporous residual products of reaction from being subjected to an excessive reaction time, thus very materially decreasing the amount of sludge, carbon, coke and other non-fluid objectionable carbon compounds which form as a result of subjecting residual reaction products to an extended reaction period.

It has been found in the cracking of hydrocarbon oils that the semi-solid or solid materials such as sludge and coke are secondary products, that is, the cracking reaction has been found to be substantially a reaction progressing in consecutive stages, in which sludge and carbon are the heavy products of the last stages of the reaction. As gasoline and lighter materials are formed, the remainder of the oil is reduced to an increasingly heavier material which, if allowed sufficient time at sufficiently high temperatures, will ultimately be reduced to a material of sludge-like or pitchy character, which on further cracking, finally reduces to coke.

It has been further found in liquid vapor phase cracking processes that the heavier materials will remain in the liquid phase, and it is therefore evident that by limiting the time to which the liquid passing through the reaction zone is subjected to reaction temperature, the formation of sludge and coke may be substantially decreased, and perhaps prevented altogether. In other words, the reaction time factor for the non-vaporous phase should be of such length, and yet be so limited as to allow the liquid to be reduced to, and only reduced to, the very heaviest desirable liquid product which would, if further cracked, become sludge. This heavy liquid product should then be removed and cooled, and thus its further reduction to sludge and coke may be substantially prevented.

One effective method for obtaining a limited but equal reaction time for each individual particle of the liquid material passing through the reaction zone would be to cause said material to pass through said zone in a relatively small stream or streams. This would assure substantially equal reaction time for each fraction. However, in a reaction zone consisting of a chamber, or of several chambers like those which at the present time are widely used commercially, such a small stream or streams could only be obtained by the installation of baffles or guiding walls, which would however, have the disadvantage of introducing large surfaces to which a (more or less) stagnant film of said oil would adhere. This would be undesirable, since the stagnant oil remains in the reaction zone overtime, thereby being reduced initially to the sludge state, and eventually to the carbon state. Carbon deposits, if once formed, have been found to have a rougher surface than the metal walls, which rougher surface will cause oil films of even greater thickness than will form on the relatively smooth metal walls to remain stagnant in the reaction zone.

The rate of coke deposit caused by said stagnant portions of oil, will therefore increase as the run progresses, and the building up of coke on the walls will take place rapidly.

For practical purposes then, a possible way of securing the beneficial results of limited reaction time for said liquid may comprise the maintenance of a small body of oil in the bottom of a reaction drum. By not agitating this body or pool of oil in any manner, and by entering the oil above and withdrawing same at the bottom, one may reasonably expect a more or less uniform downward flow throughout this mass of oil, thus obtaining to a considerable extent, the desired equal reaction time for each particle of the oil, and by regulating the volume of oil contained in the chamber relative to the amount flowing therethrough, the control of the reaction time of the liquid may easily be brought about.

However, in a reaction zone of the drum type in which this liquid is maintained in bulk, the speed at which the oil flows is necessarily low, and therefore the thickness of the layer or film of stagnant oil adhering to the walls will be at its maximum. The relative proportions of this stagnant oil may be materially reduced, or may even be substantially eliminated, which is the chief purpose of the present invention.

My invention, therefore, comprises a process of, and mechanical means for, substantially decreasing or preventing altogether the formation of stagnant portions of the oil, which passes in the liquid phase through the reaction zones of cracking processes.

The mechanism acting within the liquid phase portion of the reaction zone is so arranged as to disturb only the oil in contact with or immediately adjacent to the inner wall surface of the reaction zone without substantially affecting the even flow of the main body of oil. This mechanism should be of such construction that substantially no oil will be stagnant relative to the mechanism itself.

In the drawings:

Fig. 1 is a vertical elevational view with parts in vertical section illustrating a reaction drum equipped with means for accomplishing the purpose of the invention.

Fig. 2 is a cross sectional view taken on line 2—2 of Fig. 1.

Referring more in detail to the drawings, 1 designates as a whole a metal shell which in the present instance is illustrated as being vertically disposed, which chamber is adapted to function as a reaction drum. Heated hydrocarbon fluid from a suitable heating zone, which for instance, may comprise connected lengths of tubing forming a heating tube, may be introduced through the inlet line 2 in which may be interposed a valve 3. Such hydrocarbon fluid while passing through the heating zone has reached a reaction temperature under suitable superatmospheric pressure, and upon being introduced into said reaction drum 1, it will separate into vapors and non-vaporous residual reaction products, the vapors passing out through vapor line 4 in which may be interposed a valve 5 while the liquid falls to the bottom of said shell, collecting in a pool or body 6, the liquid level of which is designated at L. Portions of said non-vaporous residual products of reaction may be withdrawn through the drawoff line 7 controlled by the valve 8. By controlling the amount of residue withdrawn through the line 7 relative to the charge introduced through the line 2, the liquid level of the oil body 6 may be definitely controlled. A level indicator at 9 may be disposed along the outer side wall of the shell 1. It is to be understood that any suitable indicator or series of indicators to accomplish this purpose may be employed.

As a feature of the invention, the liquid level of the body 6 is maintained relatively low, with the object in mind of limiting the time to which the oil in said body is subjected to temperature conditions which cause said oil to be reduced to sludge and finally to coke.

In order to decrease, and in many cases, prevent the formation and existence of stagnant portions of oil adjacent to the inner walls of the shell 1, I have provided a mechanism for imparting a mild eddy-like motion to the oil immediately adjacent the drum wall. This instrumentality may comprise a vertically disposed rotatable shaft 10, which may have a beveled gear 11 keyed to its upper end, adapted to mesh with beveled gear 12 carried on the shaft 13, through which power is transmitted to rotate the shaft 10. The shaft 10 may be journalled in the bearings 14 on the exterior of the shell 1 and at 15 in the interior of the shell 1. The bearing 15 may be supported on the cross piece 16. The shaft may terminate in the element 17 adapted to carry the supporting arms 18, which arms may be circumferentially spaced from each other, and which project at an angle outward from the shaft 10. Depending from each of the arms 18 is a depending element or arm 19, the outer edge of which is disposed immediately adjacent one surface of the chamber wall. The chamber 1 may flare inwardly adjacent its lower end as shown at 20, and if so, the lower portion of each depending arm 19 may follow the curvature of the portion 20 as illustrated in the drawings. Spacing rods 21 may extend between and connect with each of the arms 19 to impart to said arms additional rigidity. The bearings 14 and 15 may be of any suitable design, the top bearing being preferably provided with means to prevent the escape of vapors from the chamber. In place of a rotating motion, it is to be understood that any suitable motion may be imparted to the shaft 10 and through it to the arms 19 as will impart to the oil the desired movement. It is to be noted that the bearing 15 is mounted above the liquid level of the pool 6, and in addition the cross arms 18 forming the spider are also preferably positioned at and maintained above the level of said oil body 6. The intermediate mechanism is so designed that it may be brought into the chamber through the manholes 21' which are normally closed by the covers 22, each of the elements being bolted as shown at 23, to permit assembly and dissembly within the chamber.

In operating the mechanism described, the liquid level is maintained at or below the points marked L, so that only the depending elements 19 of said mechanism are submerged in the liquid. The entire assembly rotates at a very slow rate, for instance ten or twenty revolutions per minute, more or less, depending on the number of arms 19, which it is to be noted, is sufficiently slow to prevent agitation of the main body of the oil. The movement of the depending elements 19 immediately adjacent the chamber wall, cause a decided eddying and disturbance along the surface of the wall, thus breaking up stagnant portions of the oil while the main body of oil 6 will remain substantially undisturbed although it will rotate in the direction of the mechanism.

The mechanism has been illustrated without central supports below the arms 18. Such intermediate supports may or may not be employed within the concept of the invention. A desirable result obtained by the practice of the present invention is that with the substantial elimination of coke deposit in the chamber 1, it is not necessary to successively raise the liquid level in response to the gradually increasing amounts of coke which would formerly collect in the reaction chamber, and thus the vapor phase portion of the reaction zone can, in the practice of the present invention, be maintained at its maximum volume throughout the operation of the process. In addition, the present invention will permit continuous operating time to be greatly increased, without requiring the use of reaction drums of very large size, otherwise necessary for coke storage.

The following comparative commercial runs will illustrate the utility of the present invention. Run No. 1 is a normal run in a commercial cracking process, in which little or no attempt was made to maintain a low level and no mechanical disturbance of the non-vaporized body in the chamber took place. Run No. 2 illustrates a run in the commercial cracking process in which the non-vaporized residue in the chamber was maintained at a low level, and mechanical disturbance of said body for the purpose of decreasing or preventing stagnant portions took place.

Run No. 1

Analysis of charging stock:
18° A. P. I.
.9% over at 210° C.
14% over at 300° C.

On stream—44 hours.
Intake: 1741 barrels.

| Yields: | Barrels | Per cent vol. on raw oil | Degrees A. P. I. |
|---|---|---|---|
| Pressure distillate | 832 | 47.78 | 49.7 |
| Cracked residuum | 893 | 51.33 | 9.8 |
| Loss including coke and gas | 16 | .89 | |
| Totals | 1741 | 100.00 | |

Coke—38,000 pounds   6.62% by weight.

Analysis of pressure distillates:

| | Per cent by vol. on raw oil | Degrees A. P. I. | F. B. P. |
|---|---|---|---|
| Gasoline | 32.20 | 52 | 230° C. |
| Bottoms | 14.14 | | |
| Loss | 1.44 | | |
| Total | 47.78 | | |

Average temperatures:
Average furnace temperature __ 1500° F.
Transfer temperature _____ 875° F.
Working pressure _____ 125 lbs.

Run No. 2

Analysis of charging stock:
18.5° A. P. I.
0% over at 210° C.
12% over at 300° C.

On stream—84 hours.
Intake: 2652 barrels.

| Yields: | Barrels | Per cent vol. on raw oil | Degrees A. P. I. |
|---|---|---|---|
| Pressure distillate | 1201 | 45.29 | 50.4 |
| Cracked residuum | 1460 | 55.06 | 8.5 |
| Loss including coke and gas | −9 | −0.35 | |
| Total | 2652 | | |

Coke—3,500 pounds   .40% by weight.

Analysis of pressure distillate:

| | Per cent by vol. on raw oil | Degrees A. P. I. | F. B. P. |
|---|---|---|---|
| Gasoline | 33.06 | 53.9 | 228° C. |
| Bottoms | 11.55 | 32 | |
| Loss | 0.68 | | |
| Total | 45.29 | | |

Average temperatures:
Transfer temperature __ 880° F.
Working pressure _____ 125 lbs.

These two runs were carried out commercially in a commercial size apparatus and offer a good basis for comparison, since charging stock and gasoline yields are about the same. It is understood, of course, that these runs are merely illustrative and are not to be taken in any way as a limitation of the invention.

I claim as my invention:

An improvement in a cracking process of the character in which the oil is heated to a cracking temperature in a coil and thence delivered to a reaction zone wherein cracking and substantial vaporization occur comprising maintaining a relatively small body of liquid oil in the reaction chamber, compelling each particle of the liquid oil to remain in the reaction chamber for substantially the same time period by supplying the oil to the reaction chamber above the small body of oil therein, and removing the unvaporized oil from the bottom of the reaction chamber, regulating the volume of oil contained in the chamber relative to the amount flowing therethrough to control the time period of retention of each particle of oil in the reaction chamber and preventing the formation of a stagnant oil film about the periphery of said oil body by causing the oil at the periphery of the body only to have an eddy-like circulation.

DANIEL PYZEL.